United States Patent
Apecetche et al.

(10) Patent No.: US 7,816,296 B2
(45) Date of Patent: Oct. 19, 2010

(54) HINDERED POLYALICYCLIC ALKYL CATALYSTS AND THEIR USE IN A GAS-PHASE POLYMERIZATION REACTOR

(75) Inventors: Maria A. Apecetche, Bridgewater, NJ (US); John Moorhouse, Kendall Park, NJ (US); Mark G. Goode, Hurricane, WV (US); Ronald S. Eisinger, Charleston, WV (US); Kevin J. Cann, Rocky Hill, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 12/690,606

(22) Filed: Jan. 20, 2010

(65) Prior Publication Data

US 2010/0137533 A1 Jun. 3, 2010

Related U.S. Application Data

(60) Continuation of application No. 12/156,762, filed on Jun. 4, 2008, which is a division of application No. 11/249,193, filed on Oct. 13, 2005, now Pat. No. 7,414,099.

(60) Provisional application No. 60/636,292, filed on Dec. 15, 2004.

(51) Int. Cl.
*C08F 4/69* (2006.01)
*C08F 4/622* (2006.01)
*B01J 31/12* (2006.01)

(52) U.S. Cl. .................. 502/104; 502/103; 502/120

(58) Field of Classification Search .............. 526/129, 526/169, 172; 502/103, 117, 120, 171
See application file for complete search history.

(56) References Cited

U.S. PATENT DOCUMENTS

| | | | |
|---|---|---|---|
| 3,642,749 A | 2/1972 | Johnson et al. | 260/88.2 |
| 3,704,287 A | 11/1972 | Johnson et al. | 260/94.9 |
| 4,065,612 A | 12/1977 | Hamer et al. | 526/130 |
| 5,698,723 A | 12/1997 | Dai et al. | 556/10 |
| 6,326,443 B1 | 12/2001 | Monoi et al. | 526/129 |
| 6,569,966 B1 | 5/2003 | Šindeářet et al. | 526/169 |
| 7,414,099 B2 | 8/2008 | Apecetche et al. | 526/169 |

FOREIGN PATENT DOCUMENTS

| | | |
|---|---|---|
| EP | 0454434 | 10/1991 |
| EP | 0808849 | 11/1997 |
| EP | 0931796 | 7/1999 |
| EP | 0931797 | 7/1999 |

OTHER PUBLICATIONS

Richer, Jean-Claude, et al., *Chromic Acid Oxidation and Chromate Esters*, (1973), pp. 2475-2484; (Quebec).
Richer, Jean-Claude, et al., *Chromate Esters Derived From Tertiary Alcohols*, (1975), pp. 3087-3093; (Quebec).
Konst, et al.; *A Safe, Simple And Rapid Synthesis of t-Butyl Chromate*, Synthetic Communications, 10(12) (1980), pp. 905-909; (The Netherlands).

*Primary Examiner*—Caixia Lu

(57) ABSTRACT

Embodiments of the present invention include a method of polymerizing olefins comprising contacting olefins with a catalyst composition made by the process of combining a hindered polyalicyclic alkyl catalyst precursor with a particulate inorganic oxide for a deposition time greater than 2 hours to form a catalyst composition. Embodiments of the present invention also include catalyst compositions comprising a hindered polyalicyclic alkyl catalyst precursor made by the process of combining the hindered polyalicyclic alkyl catalyst precursor with a particulate inorganic oxide for a deposition time greater than 2 hours to form the catalyst composition. In one embodiment, the hindered polyalicyclic alkyl catalyst precursor is formed by first combining an acid, a compound having the formula RX, and a metal oxide selected from the group consisting of Group 3 to Group 10 oxide compounds to produce a catalyst precursor; characterized in that R is selected from the group consisting of hindered polyalicyclic alkyls, and substituted derivatives thereof, and X is selected from the group consisting of any suitable leaving group.

9 Claims, No Drawings

HINDERED POLYALICYCLIC ALKYL CATALYSTS AND THEIR USE IN A GAS-PHASE POLYMERIZATION REACTOR

CROSS-REFERENCE TO RELATED APPLICATION

This application is a continuation of U.S. patent application Ser. No. 12/156,762, filed Jun. 4, 2008, which is a divisional of U.S. patent application Ser. No. 11/249,193, filed Oct. 13, 2005, now U.S. Pat. No. 7,414,099, which claims the benefit of U.S. Ser. No. 60/636,292 filed Dec. 15, 2004, and the disclosures of which are is herein incorporated by reference in their entireties.

FIELD OF THE INVENTION

The present invention relates to hindered polyalicyclic alkyl catalyst precursors, catalyst compositions therefrom and methods of forming catalyst compositions suitable for gas-phase polymerization production of polyethylene therefrom.

BACKGROUND OF THE INVENTION

It is known that hindered polyalicyclic alkyl catalyst precursors are useful in catalyst compositions for the production of polyethylene, especially high density polyethylenes useful in such products as films and blow molding products. The synthesis of such supported hindered polyalicyclic alkyl catalyst compositions is described in U.S. Pat. Nos. 3,704,287 and 3,642,749. However, their use in a gas-phase process, where problems caused by the presence of reactor fines (small average particle size polymer particles) must be overcome to be commercially viable.

Furthermore, the synthesis of hindered polyalicyclic alkyl catalysts must be improved. The synthesis of such catalyst compositions as described in U.S. Pat. Nos. 3,704,287 and 3,642,749 includes the use of diluents such as aromatic and/or halogenated hydrocarbons, both of which are undesirable diluents. The syntheses and use in polymerization processes of other chromate esters are also described in U.S. Pat. Nos. 4,065,612, 5,698,723 and EP 0 454 434 A2. Even in the U.S. Pat. No. 5,698,723, the use of hexane as a diluent is included in the synthesis of the catalyst. These synthesis mostly derive from W. M. B. Könst and J. Th. M. F. Maessen, in 10(12) SYNTHETIC COMMUNICATIONS 905-909 (1980). Another synthesis method of chromate esters, including polyalicyclic chromate esters, can be found in J. -C. Richer and J. -M. Hachey, 53 CAN. J. CHEM. 3087-3093 (1975). The findings of Richer and Hachey suggest that the use of aqueous diluents is not desirable in forming chromate esters. Thus, a practical and useful synthesis of hindered polyalicyclic alkyl catalyst precursors is still lacking in the art. What is further lacking is a useful synthesis method of supported catalyst compositions suitable for gas-phase polymerizations that include such hindered polyalicyclic alkyl catalyst precursors.

SUMMARY OF THE INVENTION

Embodiments of the present invention include a method of polymerizing olefins comprising contacting olefins with a catalyst composition made by the process of combining a hindered polyalicyclic alkyl catalyst precursor with a particulate inorganic oxide for a deposition time greater than 2 hours, followed by contacting with a reducing agent to form a catalyst composition.

Embodiments of the present invention also include catalyst compositions comprising a hindered polyalicyclic alkyl catalyst precursor made by the process of combining the hindered polyalicyclic alkyl catalyst precursor with a particulate inorganic oxide for a deposition time greater than 2 hours, followed by contacting with a reducing agent to form the catalyst composition.

In one embodiment, the hindered polyalicyclic alkyl catalyst precursor is formed by first combining an acid, a compound having the formula RX, and a metal oxide selected from the group consisting of Group 3 to Group 10 oxide compounds to produce a catalyst precursor; characterized in that R is selected from the group consisting of hindered polyalicyclic alkyls, and substituted derivatives thereof, and X is selected from the group consisting of any suitable leaving group.

DETAILED DESCRIPTION OF THE INVENTION

General Definitions

As used herein, in reference to Periodic Table "Groups" of Elements, the "new" numbering scheme for the Periodic Table Groups is used as in the CRC HANDBOOK OF CHEMISTRY AND PHYSICS (David R. Lide ed., CRC Press $81^{st}$ ed. 2000).

As used herein, the term "substituted" means that the group following that term possesses at least one moiety in place of one or more hydrogens in any position, the moieties selected from such groups as halogen radicals (esp., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbamoyl radicals, alkyl- and dialkyl-carbamoyl radicals, acyloxy radicals, acylamino radicals, arylamino radicals, and combinations thereof The phrase "derivative thereof" means that the moiety referred to is "substituted" in any suitable fashion as one skilled in the art would understand.

As used herein, structural formulas are employed as is commonly understood in the chemical arts; lines ("——")used to represent associations between a metal atom ("M", Group 3 to Group 12 atoms) and a ligand or ligand atom (e.g., cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

A certain stereochemistry for a given structure or part of a structure should not be implied unless so stated for a given structure or apparent by use of commonly used bonding symbols such as by dashed lines and/or heavy lines.

Description

The present invention is directed to a catalyst composition and method of making the catalyst composition comprising at least one hindered polyalicyclic alkyl catalyst precursor. In one embodiment, the present invention is a catalyst composition comprising a hindered polyalicyclic alkyl catalyst precursor made by the process of combining the hindered polyalicyclic alkyl catalyst precursor with a particulate inorganic oxide for a time greater than 2 hours, followed by contacting with a reducing agent to form the catalyst composition. The catalysts herein may be referred to generally as "hindered polyalicyclic alkyl catalysts."

The present invention is also directed to a method of polymerizing olefins comprising contacting olefins with a catalyst composition made by the process of combining a hindered polyalicyclic alkyl catalyst precursor with a particulate inorganic oxide for a time greater than 2 hours, followed by contacting with a reducing agent to form the catalyst composition. In another embodiment, the combining ("deposition time") takes place for a time greater than 3 hours, and greater than 4 hours in another embodiment, and greater than 5 hours in yet another embodiment, and for a time greater than 8 hours in yet another embodiment, and for at least 10 hours in a preferred embodiment.

The catalyst precursor is described further below, and as stated above, is combined with a suitable reducing agent to form a catalyst composition suitable for olefin polymerization. The reducing agent in one embodiment is any suitable agent capable of, when combined with chromium in the +6 oxidation state, reducing the oxidation state to +3 or +2. Examples of such compounds include alkylaluminums and aluminum alkoxides (e.g. diethylaluminum ethoxide), alkylboranes, alkyl magnesium compounds and alkyl zinc compounds (e.g., diethyl zinc).

More particularly, the reducing agent is selected from compounds having the formula $AQ_3$ in one embodiment, wherein A is a Group 13 metal in one embodiment, aluminum or boron in another embodiment, and aluminum in a preferred embodiment; Q is selected from halides, $C_1$ to $C_{20}$ alkyls and $C_1$ to $C_{20}$ alkoxys in one embodiment (where the oxygen would be bound to the "A" group), and from halides, $C_2$ to $C_{20}$ alkyls and $C_2$ to $C_{20}$ alkoxys in another embodiment; and from $C_1$ to $C_{20}$ alkyls and $C_1$ to $C_{20}$ alkoxys in yet another embodiment, and from $C_1$ to $C_{10}$ alkyls and $C_1$ to $C_{10}$ alkoxys in yet another embodiment, and from $C_2$ to $C_{10}$ alkyls and $C_2$ to $C_{10}$ alkoxys in yet another embodiment; wherein in a particular preferred embodiment at least one Q group is a $C_1$ to $C_{20}$ alkoxy, preferably a $C_2$ to $C_{10}$ alkoxy. In a particular embodiment, the reducing agent is a compound having the formula $AlR^1_3$ to form the catalyst composition, wherein Al is aluminum and $R^1$ is selected from the group consisting of $C_1$ to $C_{16}$ alkyls and $C_1$ to $C_{16}$ alkoxys.

Examples of suitable alkyl aluminum reducing agents include trialkylaluminum compounds, the alkylaluminum halides, and the alkylaluminum hydrides, specific examples of which include trimethylaluminum, triethylaluminum, tributylaluminum, tridecylaluminum, diethylaluminum chloride, dibutylaluminum chloride, dibutylaluminum. bromide, dibutylaluminum iodide, dibutylaluminum fluoride, dihexyaluminum chloride, methylaluminum dichloride, ethylaluminum dibromide, butylaluminum dichloride, pentylaluminum dicloride, and the like, as are well known in the art. Illustrative alkyl borane compounds include trimethylborane, triethylborane, triisobutyl borane, tributyl borane and the like. Illustrative aluminum alkoxides include dimethylaluminum methoxide, diethylaluminum ethoxide, dibutylaluminum butoxide, dimethylaluminum ethoxide, dibutylaluminum ethoxide, and the like. Mixtures of any of these in any combination can also be used as the reducing agent of the invention.

The catalyst compositions described herein are particularly useful in combining with ethylene and optionally another comonomer to produce a polyethylene homopolymer or copolymer having a low amount of reactor fines, the "fines" defined as polymer particles that will pass through a Number 120 sieve and collects on the Number 200 sieve as described herein. In one embodiment, the polyethylenes of the invention, either homopolymers or copolymers, possess an amount of fines less than 4 weight percent by weight of the entire sample, and less than 3.5 wt % in another embodiment, and less than 3.0 wt % in yet another embodiment, and less than 2.5 wt % in yet another embodiment, and less than 2.0 wt % in yet another embodiment, and less than 1.8 wt % in yet another embodiment, and less than 1.5 wt % in yet another embodiment.

In one embodiment, the hindered polyalicyclic alkyl catalyst precursor is formed by first combining an acid, a compound having the formula RX, and a metal oxide selected from the group consisting of Group 3 to Group 10 oxide compounds in one embodiment, and from Group 4 to Group 6 metal oxides in another embodiment, and Group 6 metal oxides in yet another embodiment, and chromium in a preferred embodiment to produce a catalyst precursor; characterized in that R is selected from the group consisting of hindered polyalicyclic alkyls, and substituted derivatives thereof in one embodiment, and wherein R is selected from $C_7$ to $C_{20}$ hindered polyalicyclic alkyls and substituted derivatives thereof in another embodiment, and is selected from adamantyl and substituted adamantyl in yet another embodiment; and X is selected from the group consisting of any suitable leaving group.

The catalyst precursor in a most preferred embodiment is the reaction product of chromium oxide ($CrO_3$) and an adamantyl compound comprising at least one leaving group, for example 1-adamantanol (the hydroxyl group being the "leaving group"), one embodiment of the reaction product represented by:

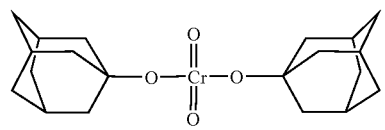

wherein the adamantyl compound comprises a leaving group such as an —OH or —Br or —$SO_3$ group, or other common leaving groups as is known in the art that is susceptible to substitution and/or elimination reactions; the adamantyl group may be further substituted such as with one or more alkyl, halogen, amine, hydroxy or other groups. Other suitable hindered polyalicyclic alkyls comprising a leaving group include 1-bromoadamantane, 1-bromobicyclo[2.2.2]octane and 1-bromobicyclo[2.2.1]heptane, 1-bicyclo[2.2.2] octanol and 1-bicyclo[2.2.1]heptanol, most preferably hindered polyalicyclic alkyls that include a leaving group bound to a tertiary carbon atom.

In one embodiment the acid is selected from the group consisting of $C_2$ to $C_{20}$ carboxylic acids and substituted derivatives thereof. In a more particular embodiment, the acid is a $C_2$ to $C_6$ carboxylic acid, and is acetic acid in a particular embodiment. In another embodiment, the acid is present in a protic diluent in a concentration from saturated to 0.1 Molar. In another embodiment, the acid is a "weak" acid characterized in that it possesses, in water, an acidity constant of from $0.1 \times 10^{-5}$ to $400 \times 10^{-5}$ such as described for carboxylic acids and benzoic acids in Morrison and Boyd, ORGANIC CHEMISTRY 735 (Sixth Edition, Prentice Hall 1992). In a particularly preferred embodiment, non-protic diluents are absent in the step of combining the metal oxide and "RX." Non-protic diluents include $C_5$ to $C_{20}$ alkanes, benzene and alkyl-substituted aromatics (e.g., toluene), halogenated hydrocarbons (e.g., carbon tetrachloride, methylene chloride) mineral oil and other hydrocarbons. In another embodiment, the acid is used in a pure state, that is, in the absence of protic or non-protic diluents. By "absence" and "absent," it is meant that the diluent in question is not purposefully added and present, if at all, to no more than 1 wt % by weight of the primary diluent as detected by common means such as chromatographic techniques common in the art.

Synthesis of the catalyst precursor is performed in one embodiment as follows. An amount of the hindered polyalicyclic alkyl, in one embodiment 1-adamantanol, is placed in a reaction vessel with a means for agitation and temperature control such as a constant temperature bath, etc. An amount of the acid, in one embodiment glacial acetic acid, is combined with the hindered polyalicyclic alkyl and agitated such as by stirring. Typically, the hindered polyalicyclic alkyl will dissolve. While stirring, the system is maintained at a temperature of from 0° C. to 100° C. in one embodiment, preferably from 25° C. to 75° C. The hindered polyalicyclic alkyl is combined with the acid from 1:2 to 1:10 wt/wt (hindered polyalicyclic alkyl:acid) in one embodiment, and from 1:2 to 1:5 wt/wt in another embodiment, and from 1:2.5 to 1:4 wt/wt in yet another embodiment.

In a separate reaction vessel from above, an amount of the Group 3 to Group 10 metal oxide, in one embodiment chromium oxide, is prepared such that it is in from 1 to 20% stoichiometric excess relative to the hindered polyalicyclic alkyl. In one embodiment, an amount of a protic diluent, water for example, is added, in one embodiment such that the metal oxide at least partially dissolves. This solution/suspension is then combined with the hindered polyalicyclic alkyl/acid, in one embodiment at a rate of combination of from 0.05 to 1 ml/min. This is then allowed to react for from 20 min to 24 hours under agitation at from 0° C. to 100° C. in one embodiment, preferably from 25° C. to 75° C.

The product of this reaction can then be extracted or washed by suitable means, preferably with the acid to fully recover the catalyst precursor product, in one embodiment bis-adamantyl chromate when the reactants combined are chromium oxide and 1-adamantanol. The product may also be washed in a hydrocarbon diluent such as toluene or hexane, preferably a hydrocarbon diluent that has been cooled to below 20° C.

The catalyst composition is then formed from the catalyst precursor in one embodiment as follows. A 10 to 100-fold excess (by weight) of a particulate inorganic oxide is combined with the catalyst precursor for a deposition time of at least 2 hours in one embodiment. In another embodiment, the deposition takes place for a time greater than 3 hours, and greater than 4 hours in another embodiment, and greater than 5 hours in yet another embodiment, and for a time greater than 8 hours in yet another embodiment, and for at least 10 hours in a preferred embodiment. The inorganic oxide is selected from the group consisting of talc, clay, silica, alumina, magnesia, zirconia, iron oxides, boria, calcium oxide, zinc oxide, barium oxide, thoria, aluminum phosphate gel, and silica-alumina, and combinations thereof, preferably silica. Preferably, the particulate inorganic oxide is dehydrated by calcining under inert atmosphere at from 400° C. to 1000° C.

More particularly, the combination of the particulate inorganic oxide and catalyst precursor is then suspended/dissolved in a hydrocarbon diluent such as hexane. This is then heated to a temperature of at least 40° C., preferably at least 50° C. The catalyst precursor is then allowed to chemisorb ("deposit") onto the inorganic oxide surface for from greater than 2 hr under continuous agitation at the elevated temperature. The catalyst precursor so combined with the particular inorganic oxide is said to be "supported" as described herein.

Next, a reducing agent is added to the suspension/solution, in one embodiment diethyl aluminum ethoxide (DEALE), 1.4 M in hexane solution (0.75 mmole Al) was then added to this silica mixture. The reducing agent can be added in any suitable amount to affect the polymerization properties of the final catalyst composition, in one embodiment such that the final catalyst composition has an Al:Cr molar ratio of from 1:1 to 10:1, preferably from 2:1 to 7:1. The hindered polyalicyclic alkyl catalyst precursor supported on the inorganic oxide is combined with the reducing agent for a time of from 1 to 5 hours, preferably for a time of from 1 to 3 hours.

After combining for a suitable time, the solvent may be removed by any suitable means such as by applying a reduced pressure. The catalyst composition comprising the hindered polyalicyclic alkyl catalyst precursor is then suitable for use in a polymerization process.

The catalyst composition of the invention is particularly suitable for use in polymerizing olefins, in one embodiment ethylene with $C_3$ to $C_{12}$ α-olefins, and in another embodiment propylene with $C_2$ or $C_4$ to $C_{12}$ α-olefins. In a particular embodiment, the catalyst composition of the invention and olefins are combined under polymerization conditions in a fluidized bed gas-phase reactor. This type reactor and means for operating the reactor are well known and completely described in, for example, U.S. Pat. Nos. 3,709,853 ; 4,003,712 ; 4,011,382 ; 4,302,566 ; 4,543,399 ; 4,882,400 ; 5,352,749 ; 5,541,270; EP-A- 0 802 202 and BE 839,380. These patents disclose gas-phase polymerization processes wherein the polymerization medium is either mechanically agitated or fluidized by the continuous flow of the gaseous monomer and diluent.

In one embodiment, a fluid bed reactor for use in the process of the present invention typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a recycle line and then through a heat exchanger wherein the heat of polymerization is removed, compressed in a compressor and then returned to the reaction zone. The present invention is advantageous in that fewer fines are produced, thus lowering the chance of blockage in the recycle line necessitating costly production slowdowns or stoppages. Control agents such as water, alcohols, ketones, alkyl amines and other catalyst moderators may be added to any part of the reactor system as described herein, and in a particular embodiment are introduced into the recycle line, and in even a more particular embodiment, introduced into the recycle line upstream of the heat exchanger.

The reactor temperature of the fluidized bed process herein ranges from 30° C. or 40° C. or 50° C. to 90° C. or 100° C. or 110° C. or 120° C. or 150° C., wherein a desirable temperature range comprises any upper temperature limit combined with any lower temperature limit described herein. In general, the reactor temperature is operated at the highest temperature that is feasible taking into account the sintering temperature of the polymer product within the reactor. Regardless of the process used to make the polyolefins of the invention, the polymerization temperature, or reaction temperature should be below the melting or "sintering" temperature of the polymer to be formed. Thus, the upper temperature limit in one embodiment is the melting temperature of the polyolefin produced in the reactor.

The gas-phase reactor pressure, wherein gases may comprise hydrogen, ethylene and higher comonomers, and other gases, is between 1 (101 kPa) and 100 atm (10,132 kPa) in one embodiment, and between 5 (506 kPa) and 50 atm (5066 kPa) in another embodiment, and between 10 (1013 kPa) and 40 atm (4050 kPa) in yet another embodiment.

The ratio of hydrogen to ethylene when producing polyethylene is in a molar ratio of from 0.01 to 0.10 in the reactor in one embodiment, and from 0.02 to 0.08 in another embodiment. The ratio of comonomer, preferably 1-hexene or 1-butene, to ethylene when producing polyethylene comonomer is in a molar ratio of from 0.001 to 0.1 in the reactor in one embodiment, and in a molar ratio of from 0.005 to 0.05 in another embodiment. The fluidized bulk density ratio to settled bulk density of polymer in the reactor is preferably in the range of from 0.2 to 0.8, most preferably in the range of from 0.5 to 0.7.

Co-catalyst is added to the reactor in one embodiment at a rate of from 50 to 200 cm$^3$/hr, and from 60 to 120 cm$^3$/hr in another embodiment. Stated another way, co-catalyst may be added to the reactor such that it is present at from 0.001 to 1 wt % by weight of the catalyst composition in one embodiment, and from 0.01 to 0.5 wt % in another embodiment, and from 0.05 to 0.2 wt % in yet another embodiment. Stated in yet another way, the co-catalyst is added with the metal oxide containing catalyst composition in a molar ratio (metal of co-catalyst to metal of catalyst precursor) ranging from 3:1 to 1:5, preferably in a molar ratio of from 2:1 to 1:4, and most preferably in a molar ratio of from 1:1 to 1:4. Suitable co-catalysts are known in the art and include alkylaluminums and alkyl zinc compounds such as triethylaluminum and diethyl zinc.

The polyolefin product ("polyolefin") of the invention is preferably a polyethylene copolymer including at least 80 wt % ethylene derived units, the remaining being $C_4$ to $C_{10}$ α-olefin derived units. In a most preferred embodiment, the α-olefin derived units are present in the polyethylene copolymer to less than 5 wt %. The aluminum residue present in the copolymer ranges from less than 2 ppmw in one embodiment, and from less than 1.5 ppmw in another embodiment, and from less than 1 ppmw in another embodiment. The metal oxide, chromium in one embodiment, residue present in the copolymer ranges from less than 2 ppmw in one embodiment, and from less than 1.5 ppmw in another embodiment, and from less than 1 ppmw in another embodiment.

The polyolefin product has a density ranging from 0.910 to 0.970 g/cm$^3$ in one embodiment, and from 0.940 to 0.960 g/cm$^3$ in preferred embodiment, and from 0.945 to 0.955 in a most preferred embodiment. The measured $I_2$ value of the polyolefin product ranges from 0.01 to 1 dg/min in one embodiment, and from 0.02 to 0.5 dg/min in another embodiment. The measured $I_{21}$ value of the polyolefin product ranges from 2 to 50 dg/min in one embodiment, and from 5 to 20 dg/min in another embodiment. The $I_{21}/I_2$ value of the polyolefin product ranges from 40 to 200 dg/min in one embodiment, and from 80 to 120 in another embodiment.

The polymer product of the present invention is suitable for any number of end use applications, examples of which include high density films, blow molded products, and pipe.

Thus, the compositions and processes of the present invention can be described alternately by any of the embodiments disclosed herein, or a combination of any of the embodiments described herein. Embodiments of the invention, while not meant to be limiting by, may be better understood by reference to the following examples.

EXAMPLES

Catalyst Precursor Preparation: Preparation of Bis-Adamantyl Chromate $(CrO_4C_{20}H_{30}, FW=386.45$ g/mol$))$

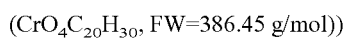
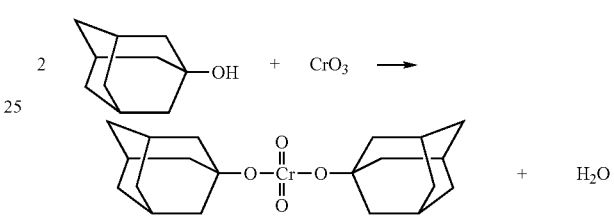

It is not necessary to carry out the synthesis in the dark, and in fact, in the examples below the synthesis was carried out under artificial light and in air. For long term storage (more than a week), it is advantageous to store in the dark. The preparation of bis-adamantyl chromate, one embodiment described herein, is set forth as follows:

1. 30 g 1-adamantanol (FW=152.25 g/mol, Aldrich) was placed in a 500 ml double neck round bottom flask with magnetic stir bar. A thermometer with a Teflon™ joint adapter and a rubber septum were placed in separate necks. The flask was placed in a pre-heated water bath placed onto a stirring/heating plate.

2. 130 ml of glacial acetic acid was added to the flask including the 1-adamantanol and stirring started; the 1-adamantanol dissolved fast and a colorless solution resulted. While stirring, the system was brought up to the working temperature of 55° C.

3. 10.837 g of CrO$_3$ (FW=99.99 g/mol, added 10% excess than stoichiometric) was placed in a wide mouth 20 ml jar provided with small magnetic stir bar and thin plastic cap. 7.225 ml of distilled water was added to the jar having the CrO$_3$, the cap was fitted onto the jar and stirring ensued until all of the CrO$_3$ dissolved, resulting in about 11.2 ml of dark brown solution.

4. The CrO$_3$ aqueous solution was added to the acetic acid 1-adamantanol solution at a rate of 0.2 ml/min over a period of 1 hour; no exotherm was observed. After the addition of less than 2 ml of CrO$_3$ solution, bis-adamantyl chromate starts precipitating as a bright orange colored solid. All of the CrO$_3$ solution was added. The mixture was allowed to react for 2 h at 55° C. under continued stirring.

5. After 2 hrs, the reaction flask was removed from the water bath and allowed to cool at 25° C. for a few minutes. The contents of the reaction flask were transferred to an a filter Buchner funnel with a glass frit (fine pore), a side hose connection to vacuum and a 24/40 joint which was fitted to an Erlenmeyer flask to collect the filtrate liquids. The reaction flask was rinsed with 10 ml of glacial acetic acid twice to fully recover the product.

6. The solid bis-adamantyl chromate was washed three times with glacial acetic acid and three more times with hexane, the hexane having been cooled in an ice bath in order to diminish the product dissolution in hexane.
7. The washed bis-adamantyl chromate was placed in a dish and dried in a vacuum oven at 40-45° C. for three hours.
8. Catalyst composition was then stored in bottles covered with aluminum foil.

Bis-Adamantyl Chromate Analytical Characterization

1. NMR Analysis $^1$H NMR was performed on the sample as isolated above. The resulting spectrum is consistent with the expected chemistry, having 3 major peaks at δ 1.95, 1.91, and 1.38 ppm in a 1:2:2 pattern. In addition, minor peaks are observed at δ 1.84, 1.55, 1.48, and 1.30 ppm, with a broad resonance occurring at δ 0.55 ppm. A sample of 1-adamantanol in toluene was also examined and found to have 3 primary resonances at δ 1.92, 1.55, and 1.46 ppm. Residual starting material is apparent in the adamantyl chromate spectrum. Based on moles of adamantanol starting material, the reaction was 88% complete. The starting material accounts for most of the impurity, but the two resonances at δ 1.30 and 1.84 are not due to the starting material. No evidence of acetic acid is observed in the spectrum. The intensity of the product peaks is 84% of the total observed proton intensity, excluding the solvent peaks, with unreacted adamantanol making up the remainder. Yields of final isolated product can be as high as 95% or higher.

2. ICP Analysis

ICP (Inductively Coupled Plasma Emission Spectroscopy) utilizes plasma as the atomization and excitation source. A plasma is an electrically neutral highly ionized gas that consists of electrons, ions and atoms. The energy that maintains analytical plasmas is derived from an electric or magnetic field; they do not burn. Temperatures of analytical plasmas range from 600 to 8000 ° K. The plasma source used in the tests herein was a Perkin-Elmer 4300 DV Optima ICP-AES spectrometer a dual-view (can be viewed either radially or axially) solid state RF (radio-frequency) generator (40 mHz). The detector system used in the ICP tests herein was a high UV quantum efficiency CCD (charge-coupled device) type detector. The CCD is an extension of solid state detector technology into two dimensions (e.g., 300×500 pixels). The detection is preceded by the separation of the emitted radiation. The separation or dispersion of light is usually made with gratings and prisms. Combining a prism and grating with a CCD allows for multi-element analysis using more than a wavelength for element. Each pixel discharges a current proportional to the energy striking it.

A sample previously digested by heating with acid, is converted into an aerosol which undergoes desolvation so water and other solvents are driven off. The remaining solids are converted into gases by action of high temperature plasma in a chemically inert environment where bonds break and only atoms are present. Atoms gain energy from collisions and emit light of a characteristic wavelength. A grating disperses the light that is quantitatively measured by the detector.

Pure bis-adamantyl chromate has a theoretical chromium content of 13.45 wt %. The ICP results of three different samples result in values of 12.9 wt %, 12.9 wt %, and 12.7 wt %.

3. DSC Analysis

Differential scanning calorimetry (DSC) characterization was performed using a TA DSC Dual Cell 2920. The heating rate is 10° C. per minute in a nitrogen atmosphere. Typically 5 to 10 mg of sample is weighed out and sealed in an aluminum pan and placed in the cell along with a blank reference pan.

The sample of adamantyl chromate as obtained above was tested for its melting properties. Endothermic transition: Melting Point: 166.41° C. Exothermal decomposition at 204.22° C.

Preparation of Small-scale Catalyst Composition Sample 1

Catalyst composition 1, as set out in Tables 1, was prepared by the following steps:

1. 0.0580 g (0.15 mmol Cr) of bis-adamantyl chromate and 3 g of Davison-955 silica dehydrated at 600° C. were combined in a clean, oven-dried airless Schlenk flask provided with stir bar and rubber septum. This operation was carried out inside the dry box.
2. 30 ml of degassed dry hexane was added to the solids, and slurried. The slurry was orange colored.
3. The Schlenk flask containing the slurry was placed in a water bath heated at 55° C. on top of a stirring/heating plate with stirring.
4. The bis-adamantyl chromate was allowed to chemisorb onto the silica surface for about 2 h under continuous stirring at 55° C.
5. 0.54 ml of diethyl aluminum ethoxide (DEALE), 1.4 M in hexane solution (0.75 mmole Al) was then added to this silica mixture. The slurry turns green. This was allowed to stir for 30 min.
6. A high vacuum was then applied for about 2 h until all the solvent was removed and the solid became a free flowing powder.
7. Catalyst content was estimated to be Cr=0.25 wt %, (0.050 mmol Cr/g solid catalyst composition). This resulted in a catalyst composition possessing an aluminum to chromium molar ratio of 5 (Al:Cr=5).

Preparation of Small-scale Catalyst Composition Sample 2

Catalyst composition 2, as set out in Tables 2, was prepared by the same procedure as for composition sample 1 except the following steps:

5. 0.16 ml (0.225 mmol Al) of diethyl aluminum ethoxide (DEALE), 1.4 M in hexane solution was added to the silica slurry. The slurry turns green. This was allowed to react for 30 min.
6. A high vacuum was applied for about 2 h until all the solvent was removed and the solid became a free flowing powder.
7. Catalyst content was estimated to be Cr=0.25 wt %, (0.050 mmol Cr/g). This resulted in a catalyst composition possessing an aluminum to chromium molar ratio of 1.5 (Al:Cr =1.5).

This procedure can be used to make any amount of catalyst with scaled ratios of materials.

Large-scale Preparation of Catalysts Compositions

Bis-adamantyl chromate for were performed using the lab procedure given above, and scaled up using same proportions. Preparations of catalyst composition for were conducted in a 6-liter jacketed glass mix vessel. This was equipped with a helical ribbon agitator extending into a conical bottom for easy mixing and discharge of solids. 680 grams of Davison 955 silica dehydrated at 600° C. were charged to the mix vessel followed by 1.4 kg of hexane that was dried over 3A sieves. These contents were heated to 45° C. while stirring. For a batch with 0.24 wt % Cr loading on the final catalyst, 12.5 grams of bis-adamantyl chromate (32.3 mmoles) were mixed with 200 grams of dried hexane in a bottle and transferred to the mix vessel as a slurry. 200 grams of additional dried hexane were used as a wash of bottle and line to accomplish complete chromate transfer. The mixture was stirred for 10 hours at 45° C. during which the bis-adamantyl chromate chemisorbed onto the silica surface. At the end of the deposition hold, for a batch with 1.5 molar ratio of DEALE/Cr, 25.2 grams of 25 wt % DEALE (48.4 mmoles) in hexane was charged to the vessel over about a five-minute period. These contents were stirred for 2 hours was 45° C. to allow reduction and treatment of the catalyst. At the end of the reduction hold, the contents were dried at atmospheric pressure at the jacket temperature that gave a product temperature of about 71° C. once the product became dry. The drying process was conducted for 24 hours. The batch was then cooled and discharged inertly. The catalyst was a free-flowing solid powder. Precautions were taken to minimize exposure of the chromate compound, the in-process catalyst batch, and the final catalyst batch to light by dimming room lights, covering glass vessels and containers with aluminum foil, and using amber bottles plus aluminum foil for the product.

In some preparations, a 2 hour chromate deposition hold was used instead of 10 hours (as indicated in the Tables below). In some preparations a molar ratio of 5 DEALE/Cr was targeted so that 85.8 grams of 25 wt % DEALE (165 mmoles) in hexane were charged, and in order to maintain 0.24 wt % Cr loading on the final catalyst, 12.7 grams of bis-adamantyl chromate (32.9 mmoles) were charged.

Comparative Catalyst Examples

Two different catalyst compositions were used in the polymerization examples as "comparative" polymerizations to elucidate advantages of the present invention. They differ from one another only in the molar ratio of DEALE/Cr added.

Both comparative catalyst compositions were bis-triphenylsilyl chromate based catalysts supported on Davison 955 silica dehydrated at 600° C. and treated with DEALE (diethylaluminumethoxide). A deposition time of 10 hours was used for chromate onto the silica support. Nominal chromium loading was 0.24 wt % on the catalyst. Some comparative catalysts were prepared on the same pilot-scale equipment described above for adamantyl chromate catalysts. Others were prepared on much larger scale, but using a similar method, in a commercial catalyst manufacturing plant.

Polyethylene Resin Analysis

Density: ASTM D 1505.

$I_2$: ASTM D 1238, 190° C., 2.16 kg.

$I_{21}$: ASTM D 1238, 190° C., 21.6 kg.

$I_5$: ASTM D 1238, 190° C., 5 kg.

X-Ray Fluorescence Analysis of Cr or Al residue: The chromium and aluminum residues remaining in the polymer from the catalyst were measured by x-ray fluorescence (XRF), which was calibrated to reference standards. The polymer resin granules were compression molded at elevated temperature into plaques having a thickness of about 3/8 of an inch for the X-ray measurement.

Bulk Density: Bulk Density (BD) was measured by pouring the polymer product via a 7/8 inch diameter funnel into a fixed volume cylinder of 400 $cm^3$. The bulk density was measured as the weight of resin divided by 400 $cm^3$ to give a value in $g/cm^3$.

Fines: Resin "fines" were measured, for example, by placing nominally 100 grams of resin on the top screen of a standard sieve screen stack in a Ro-Tap™ shaker consisting of the screens 10, 18, 35, 60, 120, 200 mesh and the pan, wherewith the resin fines were defined as that combined which collects on the 200 mesh screen and the pan.

Polymerization Process-autoclave Reactions

A one liter stainless steel jacketed reactor-autoclave equipped with a stirrer and a thermocouple was used for the polymerization reactions with the inventive and comparative example catalyst compositions. The reactor was thoroughly dried under a mild nitrogen purge at elevated temperatures (>100° C.) before each run. About 0.3 g of catalyst (supported on silica and reduced with DEALE) is weighed and mixed with 0.2 g more of silica Davison-955 dehydrated at 600° C., this additional silica having been previously treated with TEAL (the TEAL treated silica is called "TOS") in a 5 ml glass ampoule.

The TOS/catalyst mix (0.45 mmole Al/gram silica) is poured into the empty reactor that was cooled at 45 ° C. through a ½ in port while purging with slow $N_2$ flow. The purpose of the TOS is twofold; to act as scavenger of impurities (e.g., oxygen or moisture) that could deactivate the catalyst and also as a reaction booster. After the TOS/catalyst mix was charged, the reactor port was tightly sealed with a nut. If TEAL was used instead of TOS, it was loaded to the reactor mixed with the comonomer as explained below.

About 600 ml of dry, degassed iso-butane was converted into liquid in a pressure tower and fed to the reactor and the stirring is turned on and set at 650 rpm. Next, a computer-controlled flow meter introduced about 500 mL of hydrogen, after which (and by similar mechanism) ethylene was fed when the temperature, that was allowed to increase, reached 75° C. and until the reactor reached a total pressure of about 300 psi. When copolymer was prepared, 10 mL of 1-hexene (comonomer) is added to the reactor by pressure injection through a separate port. The comonomer contained in a 50 mL stainless-steel cylinder was added while ethylene was being fed and was pushed inside the reaction vessel by an ethylene flow that was diverted from the main ethylene feeding stream. The reactor content was stirred while continued being heated until the working temperature of 95° C. was reached. The final pressure of the reactor was 460 psi. Ethylene was allowed to flow to maintain its partial pressure of 200 psi. The reactor operative variables (e.g., temperature, pressure and ethylene flow) were recorded along the reaction time, and stored in a computer through a data acquisition system. The polymerization reactions with the inventive catalyst composition take place after an induction time that may vary from a few minutes up to 1 h or more. The reaction was usually allowed to proceed until a given mass of polymer is produced and the length of time to do it varies with the catalyst activity.

After the polymer was made the ethylene flow was stopped by injection of 3 ml of ethanol, employing the same device and procedure as for comonomer addition. Then the system was depressurized to ambient pressure while the temperature was reduced to about 45° C., and the reactor was opened. The mass of polymer produced by the reaction was determined after allowing all of the remaining comonomer to evaporate, until the polymer weight remained unchanged for a desired period of time, which generally was in the range of from 6 to 10 hours.

Gas-phase Polymerization

The polymerizations in these examples were conducted in a fluidized bed gas-phase reactor. More particularly, the reactor used was a pressurized gas-phase fluidized bed polymerization reactor constructed of carbon steel, the reactor comprising a vertical cylindrical section containing the bed having a height of about 4.5 to 5 feet and a diameter of nominally 14 inches, above which was a freeboard expanded section consisting of an inverted truncated cone, on top of which was another wider cylindrical straight section that extends for several feet to provide for resin disentrainment from the circulating cycle gas. The gas enters the lower portion of the fluidized bed through a distribution plate, passes through the bed where it provides mixing, heat removal and dispersion of monomers and reactant gases, and then passes through the expanded section above the bed and out of the vessel into a pipe, which connects to a blower or compressor to move the gas through the system, and then through a tubular heat exchanger that cools the gas before redirecting it to the bottom inlet of the reactor below the distributor plate to repeat the circulation loop. The amount of resin in the reactor was nominally 60 to 100 lbs and the bed level was controlled closely to a target height that is within 1 to 2 feet above or below the point that the bottom cylinder intersects the truncated inverted cone, which is usually referred to as the neck. The resin was discharged from the reactor as a dry powder in response to increase in bed weight or height as measured by differential pressure, and passed to an intermediate vessel where the reactive gases were vented and the product purged with nitrogen prior to being deposited in a receiving container. Ethylene monomer, comonomer (1-butene or 1-hexene) and hydrogen were added to the reactor at controlled specified partial pressures, concentrations and molar gas ratios as required to produce a desired polymer of desired molecular weight, molecular weight distribution and polymer density. Nitrogen was introduced to make up the composition as desired and used to control the total reactor pressure, which may generally float between accepted limits, as affected by nitrogen feed and vents from the reaction system. The monomers and other gases were added to the cycle line or base of the cycle gas Sundyne compressor, which is upstream of the cycle gas heat exchanger. The cycle gas composition was measured by passing a slip stream of cycle gas through an industrial gas chromatograph. Temperature was controlled by measuring the temperature at least one point in the fluidized bed and controlling the inlet cycle gas temperature to a lower temperature by manipulating the water temperature on the shell side of the cycle gas heat exchanger. Catalyst was added directly to the bed via a ⅛ to ¼ inch stainless steel injection tube, which passes through a packing assembly and extends a few inches into the fluidized bed at a height that is typically about 5 to 100% of the bed height, and more typically about 10 to 60% of the bed height. Other feed locations may be used. The catalyst was metered from a rotary disc feeder, with no additional diluents or oils added. Activators (co-catalyst) such as triethylaluminum were metered to the reactor in dilute solutions of isopentane via a control system, and added directly to the fluid bed at a height of 5 to 100% of the bed height. Alternatively, the activator may be added at other locations such as below the distributor plate, above the bed, or to the cycle line at various locations relative to the compressor and heat exchanger. Oxygen, when used, was added from a dilute pressurized cylinder containing nominally 200 ppmv oxygen in nitrogen, and metered at low rates to achieve control relative to the ethylene addition rate of oxygen to ethylene mole ratios ranging from zero to 1000 or greater ppbv, as indicated in the tables.

The reactor operated as a back-mixed continuous stirred tank reactor, converting raw materials to polyethylene in the presence of catalyst under controlled conditions, having a typical residence time ranging from about 1 to 6 hours and a Space Time Yield (STY) capability ranging from about 1 to 20 lb/hr/ft$^3$ or higher, and specifically as indicated in the tables. The cycle gas recirculation rate was controlled via a valve in the cycle gas loop. Static electrical disturbances in the bed were monitored by a static voltage probe, and small reactor wall skin thermocouples protruding from the reactor wall monitored the deviation of temperatures there versus the bulk bed temperature, which indicated the adhesion of resin to the reactor wall causing an insulating effect, or the increase in temperature indicating a hot spot and excess polymerization leading to a agglomeration or fusing of the resin particles. The polymerization reactions were preferably carried out under conditions of minimal fouling of the expanded section of the reactor, but as example 7 shows, can be carried out when the expanded section of the reactor possesses fouling due to fines.

More specifically, a description of the example catalysts and comparative catalysts used in the gas-phase polymerization examples, and the various reaction conditions for each run are shown in Tables 5 through 10. The polyethylene resin properties resulting therefrom are shown in Tables 11, 12 and 13.

Deposition times of the adamantyl chromate catalyst onto the silica support (step 4) were attempted at 2 hours and 10 hours, with the result that deposition times at 10 hours result in a lower amount of polymer fines and hence lower reactor fouling. These data are apparent from the gas-phase polymerization results in outlined in Tables 5 through 13. The advantage of deposition times above 2 hours on the reduced amount of "fines" in the resultant polyethylene resins is apparent.

TABLE 1

Olefin Polymerizations with small-scale Bis-Adamantyl Chromate Based Catalysts (Al:Cr, 5:1) in Autoclave reactor

| Catalyst Type | Scavenger | Productivity gPE/g Cat | Activity g PE/g Cat/h | $I_2$ | $I_{21}$ | $I_{21}/I_2$ | BD g/cm$^3$ |
|---|---|---|---|---|---|---|---|
| Comparative Example (triphenyl silyl chromate) | TOS/Cat mix | 488 | 353 | 4.4 | 75.6 | 17 | 0.44 |
| Comparative Example (triphenyl silyl chromate) | TOS/Cat mix | — | 133 | 0.12 | 13.6 | 117 | 0.49 |
| Inventive Example (adamantyl chromate) | TOS/Cat mix | 421 | 266 | 0.8 | 15.8 | 20 | 0.48 |
| Inventive Example (adamantyl chromate) | TOS/Cat mix | 495 | 198 | 2.5 | 165.9 | 66 | 0.5 |
| Inventive Example (adamantyl chromate) | TOS/Cat mix | 544 | 526 | 6.01 | 279 | 46 | 0.52 |
| Inventive Example (adamantyl chromate) | TEAL | 531 | 1677 | 11.57 | 505.6 | 44 | 0.51 |

TABLE 1-continued

Olefin Polymerizations with small-scale Bis-Adamantyl Chromate Based Catalysts (Al:Cr, 5:1) in Autoclave reactor

| Catalyst Type | Scavenger | Productivity gPE/g Cat | Activity g PE/g Cat/h | $I_2$ | $I_{21}$ | $I_{21}/I_2$ | BD g/cm$^3$ |
|---|---|---|---|---|---|---|---|
| Inventive Example (adamantyl chromate) | TOS/Cat mix | 492 | 469 | 7.58 | 447.8 | 59 | 0.48 |
| Inventive Example (adamantyl chromate) | TOS/Cat mix | 482 | 672 | 7.49 | 388.9 | 52 | 0.49 |

TABLE 2

Olefin Polymerizations with small-scale Bis-Adamantyl Chromate Based Catalysts (Al:Cr, 1.5:1) in autoclave reactor

| Catalyst Type | Scavenger | Productivity gPE/g Cat | Activity g PE/g Cat/h | $I_2$ | $I_{21}$ | $I_{21}/I_2$ | BD g/cm$^3$ |
|---|---|---|---|---|---|---|---|
| Comparative Example (triphenyl silyl chromate) | TOS/Cat mix | 260 | 65 | 0.14 | 14.3 | 99 | 0.49 |
| Comparative Example (triphenyl silyl chromate) | TOS/Cat mix | 553 | 390 | 0.06 | 10.6 | 165 | 0.49 |
| Inventive Example (adamantyl chromate) | TOS/Cat mix | 243 | 89 | 0.16 | 18.5 | 115 | 0.41 |
| Inventive Example (adamantyl chromate) | TOS/Cat mix | 484 | 282 | 0.6 | 58.1 | 97 | 0.48 |
| Inventive Example (adamantyl chromate) | TOS/Cat mix | 466 | 227 | 0.28 | 29.3 | 106 | 0.49 |

TABLE 3

Olefin Polymerizations with large-scale Bis-Adamantyl Chromate Based Catalysts (Al:Cr, 5:1) in autoclave reactor

| Catalyst Type | Scavenger | Productivity g PE/g Cat | Activity gPE/g Cat/h | $I_2$ | $I_{21}$ | $I_{21}/I_2$ | BD g/cm$^3$ |
|---|---|---|---|---|---|---|---|
| Comparative Example (triphenyl silyl chromate) | TOS/Cat mix | 563 | 305 | 0.64 | 56.2 | 88 | 0.46 |
| Comparative Example (triphenyl silyl chromate) | TOS/Cat mix | 510 | 450 | 3.93 | 307 | 78 | 0.48 |
| Inventive Example (adamantyl chromate) | TOS/Cat mix | 498 | 679 | 6.84 | 436 | 64 | 0.51 |
| Inventive Example (adamantyl chromate) | TOS/Cat mix | 547 | 781 | 7.66 | 455.9 | 60 | 0.47 |
| Inventive Example (adamantyl chromate) | TOS/Cat mix | 513 | 530 | 6.86 | 444.6 | 65 | 0.49 |

TABLE 4

Olefin Polymerizations with large-scale Bis-Adamantyl Chromate Based Catalysts (Al:Cr, 1.5:1) in autoclave reactor

| Catalyst Type | Scavenger | Productivity gPE/g Cat | Activity g PE/g Cat/h | $I_2$ | $I_{21}$ | $I_{21}/I_2$ | BD g/cm$^3$ |
|---|---|---|---|---|---|---|---|
| Comparative Example (triphenyl silyl chromate) | TOS/Cat mix | 260 | 65 | 0.14 | 14.3 | 99 | 0.49 |
| Comparative Example (triphenyl silyl chromate) | TOS/Cat mix | 553 | 390 | 0.06 | 10.6 | 165 | 0.49 |
| Inventive Example (adamantyl chromate) | TOS/Cat mix | 482 | 273 | 0.46 | 41.1 | 89 | 0.50 |
| Inventive Example (adamantyl chromate) | TOS/Cat mix | 361 | 173 | 0.42 | 40.1 | 96 | 0.46 |
| Inventive Example (adamantyl chromate) | TOS/Cat mix | 220 | 94 | 0.37 | 39.1 | 106 | 0.44 |
| Inventive Example (adamantyl chromate) | TOS/Cat mix | 155 | 89 | 0.48 | 51.5 | 107 | 0.44 |

TABLE 4-continued

Olefin Polymerizations with large-scale Bis-Adamantyl Chromate Based Catalysts (Al:Cr, 1.5:1) in autoclave reactor

| Catalyst Type | Scavenger | Productivity gPE/g Cat | Activity g PE/g Cat/h | $I_2$ | $I_{21}$ | $I_{21}/I_2$ | BD g/cm$^3$ |
|---|---|---|---|---|---|---|---|
| Inventive Example (adamantyl chromate) | TOS/Cat mix | 539 | 324 | 0.51 | 49.4 | 97 | 0.49 |
| Inventive Example (adamantyl chromate) | TOS/Cat mix | 532 | 326 | 0.71 | 57.9 | 82 | 0.49 |

TABLE 5

Catalyst Preparations for Gas-phase Reactor Polymerizations

| | Catalyst | | | | | |
|---|---|---|---|---|---|---|
| | Comparative (triphenyl silyl chromate) | Inventive (Adamantyl chromate) | Comparative (triphenyl silyl chromate) | Inventive (Adamantyl chromate) | Inventive (Adamantyl chromate) | Inventive (Adamantyl chromate) |
| Sample No. | C1 | 2 | C3 | 4 | 5 | 6 |
| Silica Source | 955[1] | 955 | 955 | 955 | 955 | 955 |
| Silica dehydration temperature | 600° C. | 600° C. | 600° C. | 600° C. | 600° C. | 600° C. |
| chromium loading (nominal) | 0.25 wt % | 0.24 wt% | 0.25 wt % | 0.25 wt% | 0.25 wt% | 0.25 wt% |
| Chromate Deposition Time | 10 hr | 2.32 hr | 10.53 hr | 2.05 hr | 2.05 hr | 2 hr |
| Reducing agent | DEALE | DEALE | DEALE | DEALE | DEALE | DEALE |
| Al/Cr Molar Ratio (nominal) | 5:1 | 5:1 | 5:1 | 1.5:1 | 1.5:1 | 1.5:1 |
| Measured Al/Cr Molar Ratio | — | 5.74 | — | 1.93:1 | 1.93:1 | 1.75:1 |
| Aluminum alkyl reduction time | — | 2 hr | 2 hr | 2 hr | 2 hr | 2 hr |

[1] Grace Davison 955 silica

TABLE 6

Catalyst Preparations for Gas-phase Reactor Polymerizations

| Catalyst | Inventive (Adamantyl chromate) | Comparative (triphenyl silyl chromate) | Comparative (triphenyl silyl chromate) | Comparative (triphenyl silyl chromate) |
|---|---|---|---|---|
| Sample No. | 7 | C8 | C9 | C10 |
| Silica Source | 955 US | 955 US | 955 US | 955 US |
| Silica Dehydration Temperature | 600° C. | 600° C. | 600° C. | 600° C. |
| Chromium Loading (nominal) | 0.25 wt % | 0.25 wt % | 0.25 wt % | 0.25 wt % |
| Chromate Deposition Time | 2 hr | — | 10 hr | 10 hr |
| Reducing agent | DEALE | DEALE | DEALE | DEALE |
| Al/Cr Molar Ratio (nominal) | 1.5:1 | 1.14:1 | 5:1 | 5:1 |
| Measured Al/Cr Molar Ratio | 1.75:1 | — | — | — |
| Aluminum alkyl reduction time | 2 hr | — | — | — |

TABLE 7

Catalyst Preparations for Gas-phase Reactor Polymerizations

| | Catalyst | | | | | |
|---|---|---|---|---|---|---|
| | Inventive (Adamantyl chromate) | Inventive (Adamantyl chromate) | Inventive (Adamantyl chromate) | Inventive (Adamantyl chromate) | Inventive (Adamantyl chromate) | Comparative (triphenyl silyl chromate) |
| Sample No. | 11 | 12 | 13 | 14 | 15 | C16 |
| Silica Source | 955 | 955 | 955 | 955 | 955 | 955 |
| silica dehydration temp | 600° C. | 600° C. | 600° C. | 600° C. | 600° C. | 600° C. |
| Chromium Loading (nominal) | 0.24 wt% | 0.24 wt% | 0.24 wt% | 0.24 wt% | 0.24 wt% | 0.24 wt % |
| Chromate Deposition Time | 10 hr | 2 hr | 2 hr | 2 hr | 2 hr | 10 hr |
| Reducing agent | DEALE | DEALE | DEALE | DEALE | DEALE | DEALE |
| Al/Cr Molar Ratio (nominal) | 1.5:1 | 1.5:1 | 1.5:1 | 1.5:1 | 1.5:1 | 1.5:1 |
| Measured Al/Cr Molar Ratio | — | — | — | — | — | — |
| Aluminum alkyl reduction time | 2 hr | 2 hr | 2 hr | 2 hr | 2 hr | 2 hr |

TABLE 8

Reactor Conditions for Gas-phase Polymerization Examples (ethylene and 1-hexene)

| | Sample No. | | | | | |
|---|---|---|---|---|---|---|
| | C1 | 2 | C3 | 5 | 5 | 6 |
| Temperature, ° C. | 94.99 | 89.99 | 79.99 | 93.50 | 88.49 | 88.45 |
| Total Pressure, psig | 397.5 | 397.4 | 397.7 | 397.9 | 397.6 | 397.5 |
| Ethylene Partial Pressure, psia | 199 | 199 | 199 | 199 | 199 | 199 |
| H2/C2 Molar Ratio | 0.0499 | 0.0501 | 0.0498 | 0.0498 | 0.0499 | 0.0500 |
| C6/C2 Molar Ratio | 0.0045 | 0.0063 | 0.0124 | 0.0067 | 0.0120 | 0.0120 |
| Oxygen Add-Back, ppbv | None | None | None | None | None | None |
| Catalyst Feeder shot/min | 1.70 | 2.57 | 3.61 | 4.00 | 4.06 | 4.05 |
| Catalyst Productivity lb PE/lb cat | 3290 | 3165 | 2905 | 3012 | 3012 | 3175 |
| Superficial Gas Velocity, ft/sec | 1.78 | 1.78 | 1.74 | 1.83 | 1.78 | 1.78 |
| Bed Weight, lb | 81 | 80 | 90 | 93 | 75 | 74 |
| Production Rate, lb/hr | 28 | 24 | 27 | 33 | 34 | 27 |
| Residence Time, hr | 2.9 | 3.3 | 3.3 | 2.8 | 2.2 | 2.8 |
| Fluidized Bulk Density, lb/ft$^3$ | 22.2 | 20.8 | 23.0 | 21.2 | 10.3 | 9.3 |
| Fluidized BD/Settled BD | 0.69 | 0.64 | 0.67 | 0.62 | 0.31 | 0.28 |
| Indicated Bed Height, ft | 3.82 | 4.02 | 4.11 | 4.57 | 7.68 | 8.39 |
| STY, lb/hr/ft$^3$ | 7.7 | 6.2 | 6.9 | 7.5 | 4.6 | 3.4 |
| co-catalyst | Diethyl zinc | Diethyl zinc | TEAL | TEAL | TEAL | TEAL |
| [co-catalyst], wt % | 0.10 | 0.10 | 0.02 | 0.02 | 0.02 | 0.02 |
| Co-catalyst flowrate, cm$^3$/hr | 87.5 | 73.0 | 58.0 | 65.2 | 70.1 | 64.5 |
| Al (or Zn) Added/Cr Molar Ratio (nominal) | 2.37 Zn/Cr | 2.22 Zn/Cr | 0.31 Al/Cr | 0.30 Al/Cr | 0.31 Al/Cr | 0.38 Al/Cr |
| Al (or Zr) residue in PE, ppmw | 4.27 | 4.15 | 0.59 | 0.54 | 0.56 | 0.65 |

TABLE 9

Reactor Conditions for Gas-phase Polymerization Examples (ethylene and 1-hexene)

| | Sample No. | | | |
|---|---|---|---|---|
| | 7 | C8 | C9 | C10 |
| Temperature, °C. | 85.99 | 85.99 | 105.9 | 105.9 |
| Total Pressure, psig | 396.0 | 378.1 | 347.4 | 347.6 |
| Ethylene Partial Pressure, psia | 200 | 196 | 200 | 199 |
| H2/C2 Molar Ratio | 0.0496 | 0.0502 | 0.0509 | 0.0501 |
| C6/C2 Molar Ratio | 0.0121 | 0.0110 | 0.0015 | 0.0015 |
| Oxygen Add-Back, ppbv | None | None | None | None |
| Catalyst Feeder A, shot/min | 6.00 | 5.30 | 4.00 | 3.37 |
| Catalyst Feeder B, shot/min | — | — | 3.34 | — |
| Catalyst Productivity, lb PE/lb cat | 2513 | 2617 | 3251 | 3792 |
| Superficial Gas Velocity, ft/sec | 1.59 | 1.24 | 1.81 | 1.80 |
| Bed Weight, lb | 92 | 100 | 77 | 67 |
| Production Rate, lb/hr | 33 | 26 | 33 | 25 |
| Residence Time, hr | 2.8 | 3.8 | 2.3 | 2.7 |
| Fluidized Bulk Density, lb/ft$^3$ | 5.0 | 2.4 | 15.7 | 15.5 |
| Fluidized BD/Settled BD | 0.16 | 0.08 | 0.58 | 0.56 |
| Indicated Bed Height, ft | 19.20 | 44.07 | 5.09 | 4.53 |
| STY, lb/hr/ft$^3$ | 1.8 | 0.6 | 6.8 | 5.8 |
| co-catalyst | TEAL | TEAL | None | TEAL |
| [co-catalyst], wt % | 0.02 | 0.02 | None | 0.02 |
| Co-catalyst flowrate, cm$^3$/hr | 76.1 | 68.3 | 0.0 | 62.8 |
| Al Added/Cr Molar Ratio (nominal) | 0.29 Al/Cr | 0.34 Al/Cr | 0.00 Al/Cr | 0.47 Al/Cr |
| Al residue in PE, ppmw | 0.63 | 0.72 | 0.00 | 0.69 |

TABLE 10

Reactor Conditions for Gas-phase Polymerization Examples (ethylene and 1-hexene)

| | Sample No. | | | | | |
|---|---|---|---|---|---|---|
| | 11 | 12 | 13 | 14 | 15 | C16 |
| Temperature, °C. | 86.96 | 87.00 | 93.20 | 95.41 | 95.00 | 97.49 |
| Total Pressure, psig | 348.1 | 348.0 | 347.9 | 348.2 | 348.0 | 348.2 |
| Ethylene Partial Pressure, psia | 199 | 199 | 200 | 199 | 199 | 199 |
| H2/C2 Molar Ratio | 0.0500 | 0.0502 | 0.0499 | 0.0500 | 0.0501 | 0.0500 |
| C6/C2 Molar Ratio | 0.0088 | 0.0081 | 0.0067 | 0.0061 | 0.0063 | 0.0054 |
| Oxygen Add-Back, ppbv | None | None | None | None | None | None |
| Catalyst Feeder A, shot/min | 6.00 | 6.00 | 4.00 | 3.20 | 2.80 | 2.80 |
| Catalyst Productivity, lb PE/lb cat | 1302 | 1512 | 2819 | 3332 | 3511 | 4111 |
| Superficial Gas Velocity, ft/sec | 1.52 | 1.52 | 1.48 | 1.50 | 1.47 | 1.50 |
| Bed Weight, lb | 79 | 65 | 73 | 73 | 73 | 74 |
| Production Rate, lb/hr | 22 | 21 | 41 | 31 | 28 | 27 |
| Residence Time, hr | 4.3 | 3.0 | 1.8 | 2.3 | 2.6 | 2.8 |
| Fluidized Bulk Density, lb/ft$^3$ | 19.7 | 12.5 | 17.9 | 17.5 | 17.7 | 18.3 |
| Fluidized BD/Settled BD | 0.65 | 0.40 | 0.54 | 0.52 | 0.53 | 0.55 |
| Indicated Bed Height, ft | 4.18 | 5.42 | 4.28 | 4.33 | 4.30 | 4.21 |
| STY, lb/hr/ft$^3$ | 4.6 | 4.1 | 10.0 | 7.5 | 6.7 | 6.6 |
| co-catalyst | TEAL | TEAL | TEAL | TEAL | TEAL | TEAL |
| [Co-catalyst], wt % | 0.02 | 0.02 | 0.02 | 0.02 | 0.02 | 0.02 |
| Co-catalyst flowrate, cm$^3$/hr | 73.6 | 70.0 | 191.5 | 176.9 | 217.7 | 63.9 |
| Al Added/Cr Molar Ratio (nominal) | 0.27 Al/Cr | 0.26 Al/Cr | 0.68 Al/Cr | 0.99 Al/Cr | 1.44 Al/Cr | 0.51 Al/Cr |
| Al residue in PE, ppmw | 1.10 | 0.90 | 1.27 | 1.56 | 2.16 | 0.66 |

TABLE 11

Product Properties for Gas-phase Polymerization Examples (ethylene and 1-hexene)

| | Sample No. | | | | | |
|---|---|---|---|---|---|---|
| | C1 | 2 | C3 | 4 | 5 | 6 |
| $I_2$, dg/min | 0.08 | 0.29 | 0.09 | 0.09 | 0.07 | 0.08 |
| $I_5$, dg/min | 0.39 | 1.39 | 0.54 | 0.49 | 0.38 | 0.42 |
| $I_{21}$, dg/min | 9.10 | 26.86 | 12.77 | 10.02 | 8.49 | 9.05 |
| $I_{21}/I_5$ | 23.2 | 19.4 | 23.8 | 20.5 | 22.3 | 21.8 |
| $I_{21}/I_2$ | 114.7 | 93.6 | 136.4 | 107.1 | 122.8 | 117.1 |
| Density, g/cm$^3$ | 0.9492 | 0.9545 | 0.9505 | 0.9480 | 0.9444 | 0.9443 |
| Settled Bulk Density, lb/ft$^3$ | 32.40 | 32.73 | 34.20 | 34.33 | 33.13 | 33.17 |
| APS, inch (average particle size) | 0.0267 | 0.0247 | 0.0257 | 0.0233 | 0.0173 | 0.0166 |
| Fines (thru #120 Sieve), wt % | 1.12 | 0.79 | 1.83 | 4.38 | 6.83 | 7.38 |
| Residual Chrome (XRF), ppmw | 0.76 | 0.79 | 0.86 | 0.83 | 0.83 | 0.79 |

TABLE 12

Product Properties for Gas-phase Polymerization Examples (ethylene and 1-hexene)

| | Sample No. | | | |
|---|---|---|---|---|
| | 7 | C8 | C9 | C10 |
| $I_2$, dg/min | 0.22 | 0.14 | 0.21 | 0.27 |
| $I_5$, dg/min | 1.06 | 0.71 | 0.98 | 1.26 |
| $I_{21}$, dg/min | 19.68 | 13.99 | 16.63 | 20.24 |
| $I_{21}/I_5$ | 18.6 | 19.7 | 16.9 | 16.0 |
| $I_{21}/I_2$ | 90.4 | 97.4 | 79.4 | 73.7 |
| Density, g/cm$^3$ | 0.9445 | 0.9412 | 0.9540 | 0.9541 |
| Settled Bulk Density, lb/ft$^3$ | 30.67 | 30.77 | 27.17 | 27.63 |
| APS, inch (average particle size) | 0.0141 | 0.0190 | 0.0221 | 0.0227 |
| Fines (thru #120 Sieve), wt % | 3.82 | 1.29 | 1.27 | 1.15 |
| Residual Chrome (XRF), ppmw | 0.99 | 0.96 | 0.77 | 0.66 |

TABLE 13

Product Properties for Gas-phase Polymerization Examples (ethylene and 1-hexene)

| | Sample No. | | | | | |
|---|---|---|---|---|---|---|
| | 11 | 12 | 13 | 14 | 15 | C16 |
| $I_2$, dg/min | 0.094 | 0.102 | 0.061 | 0.100 | 0.089 | 0.087 |
| $I_5$, dg/min | 0.54 | 0.56 | 0.34 | 0.52 | 0.48 | 0.46 |
| $I_{21}$, dg/min | 11.29 | 11.70 | 7.73 | 11.09 | 10.33 | 9.46 |
| $I_{21}/I_5$ | 21.1 | 20.8 | 22.9 | 21.2 | 21.6 | 20.6 |
| $I_{21}/I_2$ | 120.7 | 115.0 | 126.7 | 111.2 | 115.6 | 108.1 |
| Density, g/cm$^3$ | 0.9488 | 0.9494 | 0.9476 | 0.9489 | 0.9479 | 0.9466 |
| Settled Bulk Density, lb/ft$^3$ | 30.13 | 31.07 | 33.27 | 33.63 | 33.13 | 33.33 |
| APS, inch (average particle size) | 0.0210 | 0.0204 | 0.0237 | 0.0195 | 0.0205 | 0.0202 |
| Fines (thru #120 Sieve), wt % | 2.68 | 5.05 | 4.14 | 6.29 | 5.58 | 4.56 |
| Residual Chrome (XRF), ppmw | 1.84 | 1.59 | 0.85 | 0.72 | 0.68 | 0.58 |

We claim:

1. A process to produce a catalyst composition comprising the steps of combining an acid, a compound having the formula RX, and an aqueous metal oxide solution, wherein the metal oxide is selected from the group consisting of Group 3 to Group 10 oxide compounds to produce a hindered polyalicyclic alkyl catalyst precursor; characterized in that R is selected from the group consisting of hindered polyalicyclic alkyls, and substituted derivatives thereof, and X is selected from the group consisting of any suitable leaving group;

combining the hindered polyalicyclic alkyl catalyst precursor with a particulate inorganic oxide for a deposition time greater than 2 hours, followed by contacting said combination with a reducing agent to form the catalyst composition.

2. The process of claim 1, wherein the metal oxide is selected from the group consisting of Group 4 to Group 6 metal oxides.

3. The process of claim 1, wherein the metal oxide is selected from the group consisting of Group 6 metal oxides.

4. The process of claim 1, wherein the deposition time is greater than 4 hours.

5. The process of claim 1, wherein R is selected from $C_7$ to $C_{20}$ hindered polyalicyclic alkyls and substituted derivatives thereof.

6. The process of claim 1, wherein R is selected from adamantyl and substituted adamantyl.

7. The process of claim 1, wherein the acid is selected from the group consisting of $C_2$ to $C_{20}$ carboxylic acids and substituted derivatives thereof.

8. The process of claim 1, wherein the acid is present in a protic diluent in a concentration from saturated to 0.1 Molar in the combining step to produce the polyalicyclic alkyl catalyst precursor.

9. The process of claim 1, wherein non-protic diluents are absent in the combining step to produce the polyalicyclic alkyl catalyst precursor.

* * * * *